United States Patent
Bazin

(10) Patent No.: US 11,882,210 B2
(45) Date of Patent: Jan. 23, 2024

(54) METHOD FOR TRACING A DIGITAL INFORMATION ELEMENT IN A COMPUTER SYSTEM

(71) Applicant: The Swatch Group Research and Development Ltd, Marin (CH)

(72) Inventor: Jean-Luc Bazin, Tuescherz-Alfermee (CH)

(73) Assignee: The Swatch Group Research and Development Ltd, Marin (CH)

( * ) Notice: Subject to any disclaimer, the term of this patent is extended or adjusted under 35 U.S.C. 154(b) by 98 days.

(21) Appl. No.: 17/336,813

(22) Filed: Jun. 2, 2021

(65) Prior Publication Data
US 2021/0399884 A1 Dec. 23, 2021

(30) Foreign Application Priority Data

Jun. 19, 2020 (EP) ..................................... 20181008

(51) Int. Cl.
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/0872* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 10,102,526 B1* | 10/2018 | Madisetti ............. | G06Q 20/389 |
| 2010/0119061 A1* | 5/2010 | Kawale ................... | H04L 9/302 |
| | | | 380/44 |

(Continued)

FOREIGN PATENT DOCUMENTS

| | | |
|---|---|---|
| JP | 2005-45486 A | 2/2005 |
| JP | WO2007/122726 A1 | 8/2009 |

(Continued)

OTHER PUBLICATIONS

European Search Report dated Nov. 20, 2020 in European Application 20181008.2 filed Jun. 19, 2020 (with English Translation of Categories of Cited Documents), 3 pages.

(Continued)

*Primary Examiner* — Benjamin E Lanier
(74) *Attorney, Agent, or Firm* — Oblon, McClelland, Maier & Neustadt, L.L.P.

(57) ABSTRACT

A method for tracing a digital information element in a computer system including electronic devices of users and a system for archiving digital information elements including a blockchain-type distributed database, the method including a step of making the digital information element from the electronic device of one of the users, a step of archiving the digital information element, the archiving step including a substep of generating an identification element of the version of the digital information element, the method including a step of adding the identification element signed with a secure element associated to this user and/or to their electronic device in the distributed database, the addition step including a substep of encrypting the identification element from a cryptographic algorithm and the secure element, the cryptographic algorithm including at least one metric variable associated to the user.

7 Claims, 1 Drawing Sheet

(56) References Cited

U.S. PATENT DOCUMENTS

| | | | |
|---|---|---|---|
| 2010/0223663 A1 | 9/2010 | Morimoto et al. | |
| 2017/0206523 A1* | 7/2017 | Goeringer | G06F 21/45 |
| 2018/0075575 A1* | 3/2018 | Bostick | G06V 40/19 |
| 2018/0144156 A1* | 5/2018 | Marin | G06F 21/602 |
| 2018/0260888 A1* | 9/2018 | Paolini-Subramanya | G06Q 40/025 |
| 2019/0065709 A1 | 2/2019 | Salomon | |
| 2019/0320113 A1* | 10/2019 | Rajvanshi | H04N 5/232 |
| 2020/0084045 A1 | 3/2020 | Cohen et al. | |
| 2020/0234285 A1* | 7/2020 | Vanham | H04L 9/0825 |
| 2020/0235915 A1 | 7/2020 | Wright | |
| 2021/0281421 A1* | 9/2021 | Semenovskiy | H04L 9/3231 |
| 2021/0385091 A1* | 12/2021 | Shenoy | H04L 63/123 |

FOREIGN PATENT DOCUMENTS

| | | | |
|---|---|---|---|
| JP | 2010-154051 A | | 7/2010 |
| KR | 10-2020-0040248 | | 4/2020 |
| KR | 20220004997 A | * | 1/2022 |
| WO | WO 2019/038634 A1 | | 2/2019 |
| WO | WO 2020/073112 A1 | | 4/2020 |

OTHER PUBLICATIONS

Notice of the Reasons for Refusal dated May 24, 2022 in Japanese Patent Application No. 2021-095640 (with English language translation), 7 pages.

Korean Office Action dated Mar. 20, 2023, in Korean Patent Application No. 10-2021-0079633, 12 pages (with English Translation).

* cited by examiner

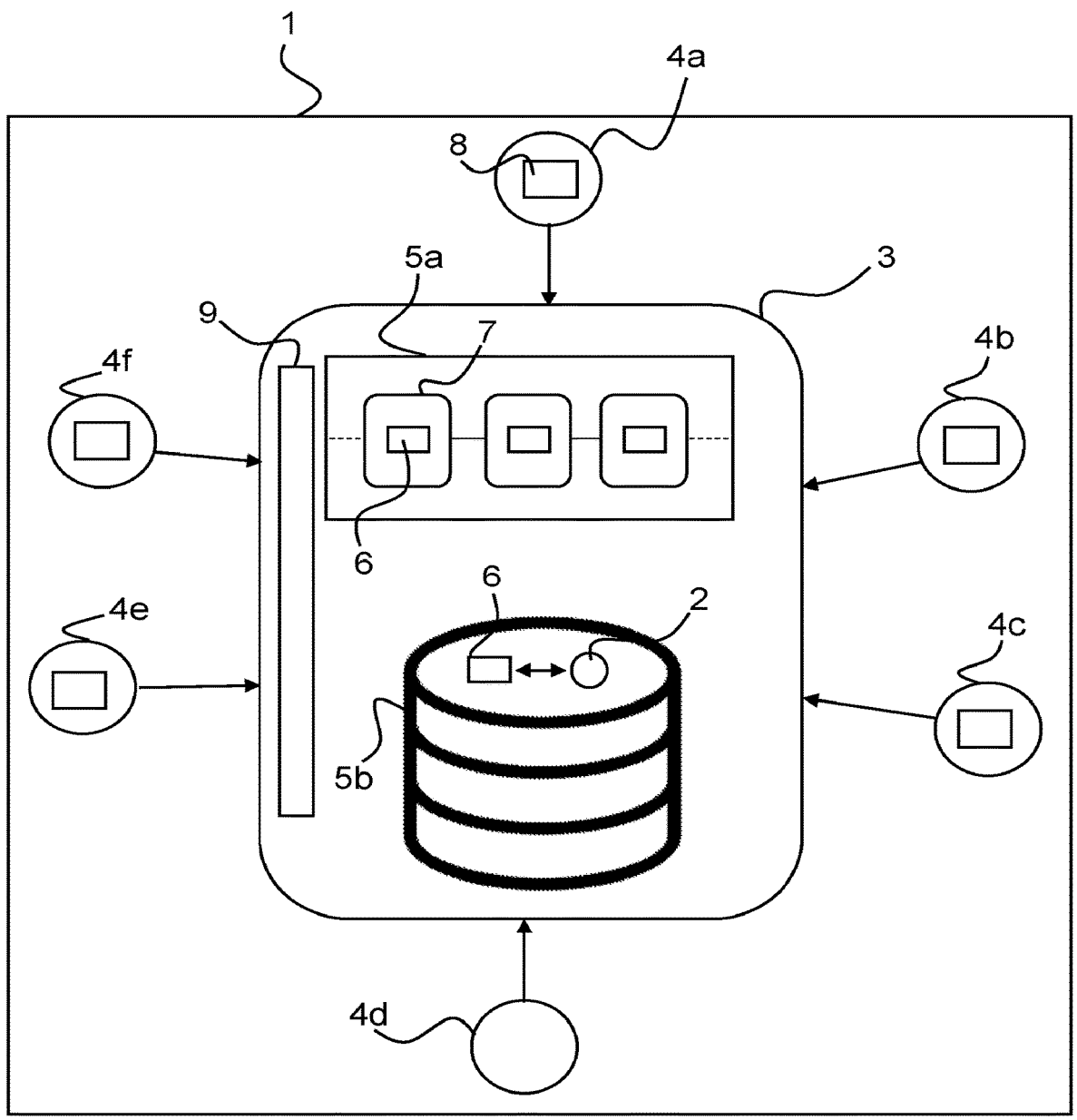

METHOD FOR TRACING A DIGITAL INFORMATION ELEMENT IN A COMPUTER SYSTEM

CROSS-REFERENCE TO RELATED APPLICATION

This application claims priority to European Patent Application No. 20181008.2 filed on Jun. 19, 2020, the entire disclosure of which is hereby incorporated herein by reference.

TECHNICAL FIELD

The present invention relates to a method for tracing a digital information element in a computer system comprising electronic devices of users connected to a system for archiving digital information elements.

The invention also relates to a computer program.

PRIOR ART

Methods for tracing digital information elements are conventionally implemented in computer systems in order to know the use of these digital information elements and in particular, the evolution of this use over time. These digital information elements are digital files comprising information such as technical information or text, audio or video information. As an example, when the digital information element comprises technical information relating to a timepiece, the traceability of this information element allows tracking the evolution of the technical information relating to the design of the timepiece over time. In this example, this technical information may cover one or several conceptual plan(s) of this timepiece.

There are known in the state of the art computer systems comprising blockchain-type distributed databases which participate in the implementation of such traceability methods. In these systems, these databases contribute in particular to securing the storage of such digital information elements and that being achieved by carrying out a systematic encryption of these from cryptographic algorithms.

Nonetheless, with the development of quantum computers provided with an increasingly high computing power capable of processing quantum volumes which may reach 64 qubits, such a securing of these digital information elements might be compromised.

In this context, it is understood that there is a need to find a solution, in particular one that has not the drawbacks of the prior art.

SUMMARY OF THE INVENTION

Consequently, an object of the present invention is to provide a solution for tracing digital information elements that is secure, reliable, trustworthy and robust.

To this end, the method for tracing a digital information element in a computer system comprising electronic devices of users and a system for archiving digital information elements comprising a blockchain-type distributed database, the method comprising:
- a step of making the digital information element from the electronic device of one of the users,
- a step of archiving said digital information element, said archiving step comprising a substep of generating an identification element of the version of the digital information element, the method comprising a step of adding the identification element signed by means of a secure element associated to this user and/or to their electronic device in said distributed database, said addition step comprising a substep of encrypting said identification element from a cryptographic algorithm and the secure element, the cryptographic algorithm comprising at least one metric variable associated to the user.

In other embodiments:
- said generation substep comprises a phase of calculating a hash value for said digital information element;
- said archiving step comprises a substep of storing the digital information element associated to the identification element in another database of the archiving system to which the electronic devices of the users are connected;
- said at least one metric variable of the cryptographic algorithm is an environment variable relating to environmental characteristics of the user;
- said at least one metric variable of the cryptographic algorithm is a location variable relating to geolocation characteristics of this user;
- said at least one metric variable of the cryptographic algorithm is a biometric variable relating to biological characteristics of the user; and/or
- said at least one metric variable of the cryptographic algorithm is a time variable relating to the date on which the addition step is initiated;
- the environment variable comprises a value relating to the temperature, to the degree of humidity or to the atmospheric pressure measured in the environment in which the user is located;
- the location variable comprises a value relating to geographic coordinates measured by a geolocation device carried by the user or to a location code;
- the method comprises a step of accessing the system for archiving digital information elements by the electronic device of one of the users from an access element associated to the electronic device and/or to the user, and
- the secure element is a private key and the access element is a certificate or a public key.

The invention relates to a computer program comprising program code instructions for the execution of the steps of this method when said program is executed by a control unit of the archiving system and the electronic device of the user.

BRIEF DESCRIPTION OF THE FIGURES

Other particularities and advantages will become apparent from the description provided hereinafter, for indicative and non-limiting purposes, with reference to FIG. 1 which is a schematic representation of an implementation of the invention.

DETAILED DESCRIPTION OF THE INVENTION

In FIG. 1, a method for tracing a digital information element 2 in a computer system 1 comprising electronic devices 4a to 4b of users and a system for archiving 3 digital information elements 2 is illustrated. These digital information elements 2 are digital files comprising digital information such as technical information, text, audio or video information, or information relating to computer applications (for example source code). As an example, this digital information may relate to technical data about timepieces (for example: conceptual plans of a horological movement or of a clock component), cadastral data, banking transactions data, patients' medical data, digital identities data, etc.

In the computer system 1, the system for archiving 3 digital information elements 2 comprises first and second databases 5a, 5b respectively a blockchain-type distributed database 5a and another non-relational or relational-type database 5b. The blockchain 5a is a distributed and secured database in which successive identification elements 6 made by the electronic devices 4a to 4f of the users, are chronologically archived in the form of blocks 7 related to one another. These identification elements 6 that we will describe in more detail later on, relate to the different versions of the digital information element 2. Hence, the blockchain 5a may be a register simultaneously recorded and synchronised over a computers network, which evolves through the addition of new identification elements 6 validated beforehand by the entire network and intended to never be modified or deleted. Hence, this distributed register is a mass of identification elements 6 distributed over several computers. In other words, this register allows making a database in which the identification elements 6 constituting the data, are spread out among the users acting on this blockchain 5a. Thus, the blockchain 5a may be distributed to different computers via a peer-to-peer type mechanism. This blockchain 5a is provided with management mechanisms allowing ensuring at all times a satisfactory level of confidence in the non-falsification of the identification elements 6.

The archiving system 3 comprises a control unit 9 including at least one microcontroller. This control unit 9 is connected to the electronic devices 4a to 4b thereby enabling the users to interact with the archiving system 3 of this computer system 1. Each electronic device 4a to 4f comprises a processing unit 8 including software and hardware elements (processor, memory elements) as well as a human-machine interface. In a non-limiting and non-exhaustive manner, the electronic device 4a to 4f may be a computer, a smartphone or a tablet or a smartwatch. It should be noted that, depending on the nature and the characteristics of the digital information elements 2, these users may be employees of a company such as a watch manufacturer, employees of an engineering office or consumers, online merchants, whether professional or not, who are goods sellers or services providers, legal or administrative entities, etc.

In this context, this method comprises a step of accessing the system for archiving 3 digital information elements 2 by the electronic device 4a to 4f of one of the users from an access element associated to the electronic device 4a to 4f and/or to the user. This access element is associated to the electronic device 4a to 4f and/or to the user because it has been generated specifically for this electronic device 4a to 4f and/or its user in the context of a use relating to this archiving system 3. Such an access element may be archived in memory elements of the processing unit 8 of the electronic device 4a to 4f used by the user to connect to and interact with the archiving system 3. This access element may also be comprised in a data medium such as a USB (Universal Serial Bus) flash drive or a magnetic card or a chip card. Such a data medium is adapted to be connected to the electronic device 4a to 4f. Hence, it should be understood that access to the archiving system 3 means accessing the first and second database 5a, 5b and therefore in particular the blockchain 5a.

This method then comprises a step of making the digital information element 2 from the electronic device 4a to 4f of the user. This step may be carried out before or after the access step. During this making step, the electronic device 4a to 4f of the user generates the digital information element 2 from its processing unit 8. As we have seen before, this digital information element 2 consists of a file comprising technical information in the form of text and figures/drawings relating to a timepiece.

Next, the method comprises a step of archiving said digital information element 2. This archiving step comprises a substep of generating the identification element 6 of the version of said digital information element 2. More specifically, this generation substep includes a phase of calculating a hash value for said digital information element 2. This hash value relating to the digital information element 2 is unique. During this calculation phase, the processing unit 8 of the electronic device 4a to 4f of the user implements one or several calculation operation(s) which provide for the application of a hash function to said digital information element 2 in order to obtain this hash value.

Afterwards, the archiving step comprises a substep of storing the information element 2 associated to the identification element 6 of the version of this information element 2 in another database 5b also called the second database 5b, of the archiving system 3 to which the electronic devices 4a to 4b of the users are connected. In other words, the information element 2 and the identification element 6 are archived together in this second database 5b and that being achieved by being associated to one another.

The method comprises a step of adding the identification element 6 signed by means of a secure element associated to this user and/or their electronic device 4a to 4f in the first database 5a, in this instance the distributed database 5a. The addition of this identification element 6 is then performed by this user by means of the processing unit 8 of the electronic device 4a to 4f which enables them to connect to this distributed database 5a.

In this method, the secure element is a private key and the access element that we have mentioned before is a certificate or a public key. The electronic certificate, also called digital certificate or public key certificate, may be assimilated to a digital identity card of this user and/or of their electronic device 4a to 4f. It participates in enabling the identification and/or the authentication of the user and/or of their electronic device in the context of access to the archiving system 3 and in particular to the blockchain 5a. Thus, this access element therefore enables this user and/or their electronic device to access this chain and in particular the identification elements 6 comprised in the blocks 7 of this chain 5a. This access element also enables this user and/or their electronic device to add new identification elements 6 in this blockchain 5a. It should be noted that, alternatively in other embodiments, the secure element may be a certificate or a public key and the access element may be a private key.

This addition step comprises a substep of encrypting said identification element 6 from a cryptographic algorithm and the secure element. More specifically, the identification element 6 that has been generated to identify the version of the digital information element 2 made by the user, then undergoes an encryption by this algorithm which implements the secure element and metric variables relating to the individual. These metric variables are associated to values relating to environmental, location and/or biometric characteristics of the user. In other words, these metric variables, also called "real-time metric variables" or "instantaneous metric variables" are therefore used by the cryptographic algorithm and may be:

environment variables relating to environmental characteristics of the user;

location variables relating to geolocation characteristics of this user, and/or biometric variables relating to biological characteristics of the user.

In this context, an environment variable comprises for example a value relating to the temperature, to the degree of humidity or to the atmospheric pressure measured in the environment in which the user is located.

When it consists of a location variable, this comprises a value relating to geographic coordinates measured by a GNSS (Global Navigation Satellite System) geolocation device carried by the user and which is compatible with satellite geo-positioning systems such as GLONASS™ (Global Navigation Satellite System), Galileo™, QZSS™ (Quasi-Zenith Satellite System) or Beidou™ systems. Alternatively, this location variable may comprise a location code corresponding to an exact position of the user. It may be a short code composed by 6 or 7 digits and/or letters. Such a code may be generated by an online mapping technical platform known in the state of the art like that one belonging to the company Google with its service "Pluscode™" of Google Maps™.

As regards the biometric variable, this includes a value relating to measured biological characteristics of the user such as the cutaneous temperature, the pulse, the respiratory rate, the blood oxygen saturation, the impedance of the skin, the respiratory arrhythmia, the sweat rate, the blood oxygen saturation or the blood flow rate.

It should be noted that the metric variable may also be a time variable relating to the date on which the addition step is initiated.

Afterwards, the addition step comprises a substep of storing the signed identification element 6 in a new block 7 of the chain 5a. Thus, this block 7 is added to the time-ordering of the blocks 7 of the chain 5a.

In particular, such a method participates in building a system for archiving 3 digital information elements 2 having unique random encryption functions with almost tamper-resistant, and even tamper-resistant, secure elements. Thus, the digital information elements 2 are stored in the archiving system while being associated to a date and an hour. Thus, the time point, at which the operations of modifying and saving the digital information element 2 are carried out, is therefore recorded, in particular thanks to the distributed database 5a.

The invention also covers a computer program comprising program code instructions for the execution of the steps of this method when said program is executed by the control unit 9 of the archiving system 3 and the electronic device 4a, 4b, 4c, 4d, 4f of the user.

The invention claimed is:

1. A method for tracing a digital information element in a computer system comprising electronic devices of a plurality of users and an archiving system for archiving digital information elements comprising a first blockchain-type distributed database, the method comprising:

receiving the digital information element from an electronic device of a user of the plurality of users, wherein the digital information element includes digital information of technical information in a form of text and drawings of a timepiece, archiving said digital information element, said archiving step comprising generating an identification element indicating a version of the digital information element including the digital information of the timepiece, wherein the archiving step comprises storing both the digital information element and the generated identification element in a second database of the archiving system to which the electronic devices of the users are connected, the second database being different from the first database, and adding, to the first database, the generated identification element having been signed using a secure element, being a key or a certificate, associated with said user and/or the electronic device, said adding step comprising encrypting the generated identification element using a cryptographic algorithm and the secure element, the cryptographic algorithm using at least one metric variable associated with the user to encrypt the generated identification element, wherein the at least one metric variable used by the cryptographic algorithm includes a date on which the adding step is initiated and a biometric variable relating to biological characteristics of the user and is different from the secure element used in the signing of the generated identification element.

2. The method according to claim 1, wherein the generating step comprises calculating a hash value of said digital information element to generate the identification element.

3. The method according to claim 1, wherein said at least one metric variable used by the cryptographic algorithm further includes an environment variable relating to environmental characteristics of the user.

4. The method according to claim 3, wherein the environment variable comprises a value relating to a temperature, to a degree of humidity, or to an atmospheric pressure measured in an environment in which the user is located.

5. The method according to claim 1, further comprising accessing the system for archiving digital information elements by the electronic device of one of the users from an access element associated with the electronic device and/or to the user.

6. The method according to claim 5, wherein the secure element is a private key and the access element is an electronic certificate or a public key.

7. A non-transitory computer-readable medium storing a computer program comprising program code instructions for execution of the steps of the method according to claim 1, when said program is executed by control circuitry of the archiving system and the electronic device of the user.

* * * * *